Dec. 16, 1969   W. SCHMIDT   3,484,597
REFLECTOR FOR AN ELECTRONIC PHOTOGRAPHIC FLASH UNIT
Filed May 19, 1967

Inventor:

3,484,597
REFLECTOR FOR AN ELECTRONIC PHOTO-GRAPHIC FLASH UNIT
Walter Schmidt, Berlin, Germany, assignor to Loewe Opta GmbH, a German Company
Filed May 19, 1967, Ser. No. 643,012
Claims priority, application Germany, May 21, 1966, Reg. No. (utility model) 1,943,739
Int. Cl. G03b 15/02; F21v 7/00
U.S. Cl. 240—1.3                                                2 Claims

ABSTRACT OF THE DISCLOSURE

A photographic flash unit having a rodlike discharge lamp, and a reflector with a curved rear portion which conforms to the curved surface of the rodlike discharge lamp and serves as a mounting device for the lamp. The reflector has a pair of resilient holding elements for pressing the lamp against the curved portion of the reflector and for serving as electrical leads to the electrodes of the lamp.

---

Figure 1:
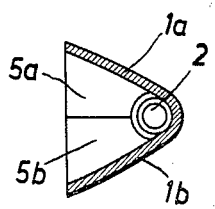

The invention relates to reflectors for electronic flash units for photographic purposes, more particularly for miniature flash units equipped with a rodlike discharge lamp, the aim of the invention being to produce a reflector which is as small as possible.

In the conventional flash units equipped with a rodlike discharge lamp, the latter is arranged in such a manner that a gap is left between the flash tube and the inner reflector wall.

To produce a miniature reflector for a flash unit, the reflector, according to the invention, is itself employed to hold the flash tube. According to the invention, the reflector is characterized by the fact that the back part situated near the flash tube coincides to a maximum part of its curved surface with the curved surface of the discharge lamp, and that the back sector of the reflector which is almost circular and which is matched to the curvature of the flash tube, rests against this flash tube.

Furthermore, according to the invention, the reflector part which rests against the flash tube may serve to hold this flash tube.

In accordance with a further embodiment of the invention, suitably shaped, preferably elastic holding pieces are incorporated which provide an additional hold for the flash tube at its ends on the body of the reflector. These elastic pieces may be of metal and can serve simultaneously as electrical leads to the flash tube electrodes.

Furthermore the metallic reflector or the reflector coated internally with metal can be electrically connected to the secondary side of the ignition transformer so that alone or in combination with an electrically conductive layer which may be present on the flash tube, it ignites the same, i.e. it serves as a starting electrode.

Figure 2:
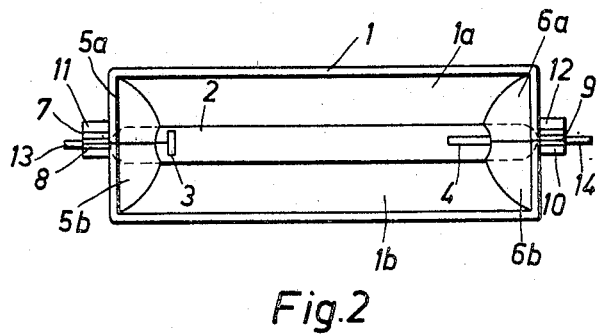
Figure 3:
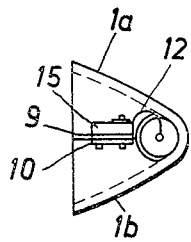
Figure 4:
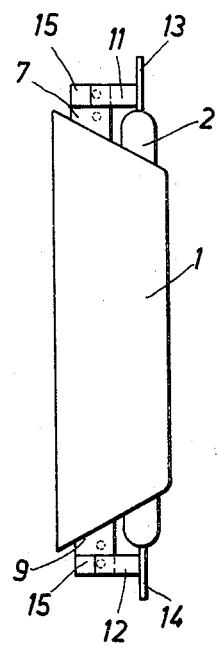

More detailed explanations of the miniature reflector in accordance with the invention are given with the aid of the figures representing an exemplary embodiment. In the drawing:

FIGS. 1 and 2 represent side sectional view of the miniature reflector and main view from the front, while FIGS. 3 and 4 show a side view and a related elevational view of the reflector.

Referring to FIGS. 1 and 2, the reflector body 1 consists of an upper reflector bowl 1a and a lower reflector bowl 1b. This reflector 1 may be of metal and provided with a mirror on the internal surface. In cases where the body of the reflector is of plastic, the sole additional feature required is a metallic coating for the reflector. The flash discharge lamp (flash tube) is designated with 2 and provided with electrodes 3 and 4. 13 and 14 are the external leads of the flash tube. The side walls of the flash reflector are designated with 5a, 5b and 6a, 6b. These side walls of the reflector carry ties 7, 9 (upper reflector bowl) and 8, 10 (lower reflector bowl). The two reflector halves, 1a and 1b, are held together by means of these ties. It will be noticed that the flash tube 2 projects through openings in the reflector side walls 5a, 5b and 6a, 6b (see FIG. 1). It will also be evident from FIG. 1 that the curved surface of the back part of the reflector 1 near the flash tube coincides to a maximum part with the curved surface of the flash tube and that the back sector of the reflector, which is almost circular and which is matched to the curvature of the flash tube, rests against this flash tube. In this way, a means is provided to insure that the flash tube 2 is held by the reflector.

As seen from FIGS. 3 and 4, suitably shaped, preferably elastic holding pieces 11 and 12 are incorporated, which provide an additional hold for the flash tube at its ends on the body of the reflector. These holding pieces 11 and 12 can for example exist of thin metal springs which at one end are soldered to the external leads 13 and 14 of the flash tube 2. The other end of springs 11 and 12 is attached by means of insulation piece 15 to ties 7 and 9 of reflector 1. By means of metal springs 11 and 12, flash tube 2 is pressed against the innermost curved surface of the reflector and thus held against the reflector. At the same time, pieces 11 and 12 can serve as leads to electrodes 3 and 4 of flash tube 2.

Furthermore, the metallic reflector, or the reflector coated internally with metal, can be electrically connected to the secondary side of the ignition transformer so that alone or in combination with an electrically conductive layer which may be present on the walls of the flash tube, it ignites the same. As a result of the flash tube being situated directly against the inner wall of the reflector, a reflector can be produced which is as small as possible, a feature which is absolutely necessary for miniature flash units.

I claim:
1. A reflector for electronic flash units for photographic purposes, more particularly for miniature flash units, comprising a reflector body including a rodlike discharge lamp, the back part of said reflector body near said lamp coinciding to a part of its curved surface with the curved surface of said lamp, and the back sector of said reflector body which is almost circular and matched to the curvature of said lamp resting against said lamp, further elastic holding means for said lamp, said elastic holding means being constructed as metal springs adapted to press said lamp against the innermost curved surface of said reflector and serving simultaneously as electrical leads to the electrodes of said lamp.

2. A reflector as claimed in claim 1, wherein said reflector is made of metal and internally coated with metal, and is electrically connected to energizing means of said flash unit.

References Cited

UNITED STATES PATENTS

| | | | |
|---|---|---|---|
| 2,839,673 | 6/1958 | Wilcoxon | 240—11.4 XR |
| 3,021,422 | 2/1962 | Ogier et al. | 240—1.3 |
| 3,127,113 | 3/1964 | Tomkinson | 240—1.3 |
| 3,237,003 | 2/1966 | Tomkinson | 240—1.3 |

NORTON ANSHER, Primary Examiner

FRED L. BRAUN, Assistant Examiner

U.S. Cl. X.R.

240—11.4, 41.35, 103